(12) United States Patent
Watada

(10) Patent No.: US 7,331,432 B2
(45) Date of Patent: Feb. 19, 2008

(54) DISK BRAKE APPARATUS

(75) Inventor: Akifumi Watada, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 0 days.

(21) Appl. No.: 11/467,054

(22) Filed: Aug. 24, 2006

(65) Prior Publication Data
US 2007/0045062 A1   Mar. 1, 2007

(30) Foreign Application Priority Data

| Aug. 26, 2005 | (JP) | ............................ P. 2005-245667 |
| Dec. 1, 2005 | (JP) | ............................ P. 2005-348119 |
| Feb. 22, 2006 | (JP) | ............................ P. 2006-044900 |

(51) Int. Cl.
*F16D 55/08* (2006.01)
*F16D 55/16* (2006.01)

(52) U.S. Cl. ....................... 188/72.7; 188/72.8

(58) Field of Classification Search ............. 188/71.7, 188/71.8, 71.9, 72.7, 72.8
See application file for complete search history.

(56) References Cited

U.S. PATENT DOCUMENTS

| 3,638,763 | A | * | 2/1972 | Laverdant | .................. | 188/72.6 |
| 3,920,102 | A | * | 11/1975 | Ito | .................. | 188/71.9 |
| 3,934,684 | A | * | 1/1976 | Evans | .................. | 188/71.9 |
| 3,991,859 | A | * | 11/1976 | Coulter et al. | .................. | 188/71.9 |
| 5,000,294 | A | * | 3/1991 | Hunnicutt et al. | .................. | 188/71.9 |
| 5,038,895 | A | * | 8/1991 | Evans | .................. | 188/72.7 |
| 5,060,765 | A | * | 10/1991 | Meyer | .................. | 188/71.9 |
| 5,788,024 | A | * | 8/1998 | Meyer | .................. | 188/72.7 |
| 5,868,225 | A | * | 2/1999 | Hulliger | .................. | 188/72.4 |
| 6,478,120 | B2 | * | 11/2002 | Runkel et al. | .................. | 188/71.9 |
| 6,509,227 | B1 | * | 1/2003 | Ping et al. | .................. | 438/255 |
| 6,651,784 | B1 | | 11/2003 | Barbosa et al. | | |
| 6,659,236 | B1 | * | 12/2003 | Clark et al. | .................. | 188/79.52 |
| 6,749,044 | B2 | * | 6/2004 | Boisseau | .................. | 188/72.7 |
| 6,854,572 | B2 | * | 2/2005 | Usui | .................. | 188/72.8 |
| 6,997,291 | B2 | * | 2/2006 | Boisseau | .................. | 188/106 F |
| 2003/0066719 | A1 | * | 4/2003 | Watanabe et al. | .................. | 188/72.7 |
| 2003/0164271 | A1 | | 9/2003 | Boisseau | | |
| 2004/0112690 | A1 | * | 6/2004 | Sekiguchi | .................. | 188/72.7 |
| 2004/0245055 | A1 | * | 12/2004 | Gerard et al. | .................. | 188/72.6 |

FOREIGN PATENT DOCUMENTS

| FR | 2820793 | 2/2001 |
| JP | 2739879 | 1/1990 |
| WO | 9110841 | 7/1991 |

* cited by examiner

*Primary Examiner*—Devon Kramer
(74) *Attorney, Agent, or Firm*—Greenblum & Bernstein, P.L.C.

(57) ABSTRACT

Axial grooves 8e and circumferential groove 8f intersecting with he axial grooves are provided in a cylinder bore 8e. A fixed-side cam plate 12 has anti-rotation projections 12c, which are projected from the fixed-side cam plate 12 and inserted into the axial grooves 8e, and fastening grooves 12d, which are formed at circumferential areas of the bottom side of the fixed-side cam plate 12 at a circumferential side of each of anti-rotation projections 12c. The housing 16 has engagement ribs 16e which are projected from the housing 16 to be engaged with the axial grooves 8e, and fastening pieces 12f, which are formed at a circumferential side of each of the engagement ribs 16e, the fastening pieces 12f being fitted in the fastening grooves 12d.

5 Claims, 5 Drawing Sheets

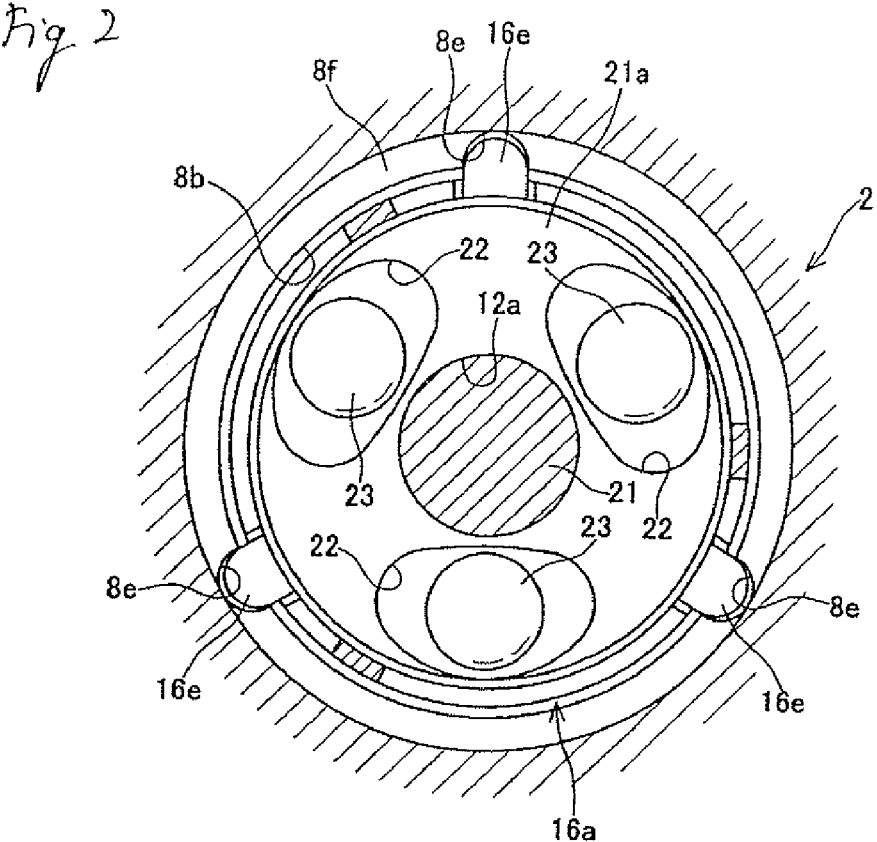
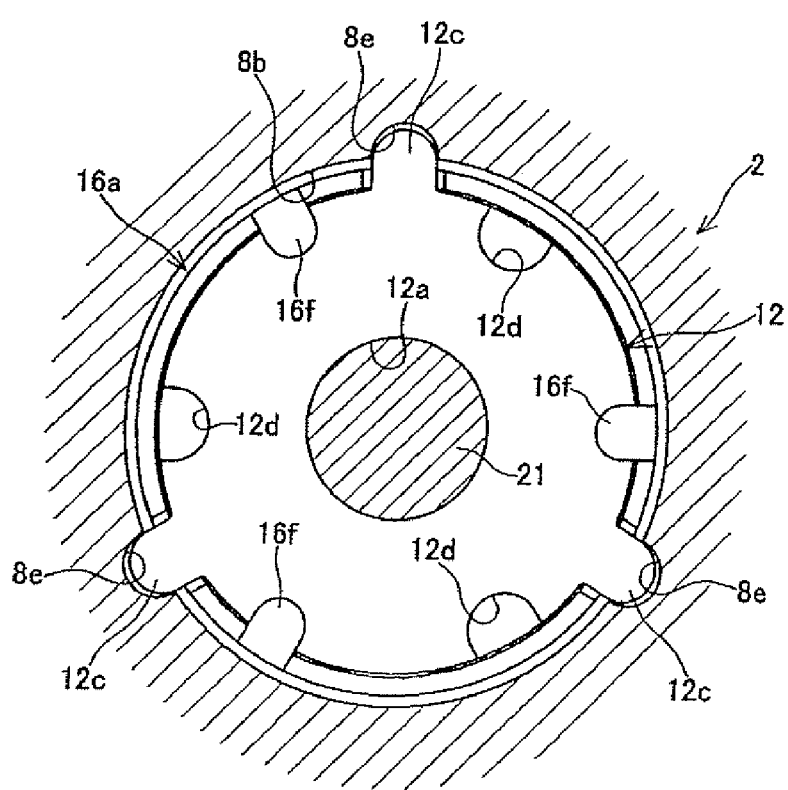

DISK BRAKE APPARATUS

BACKGROUND OF THE INVENTION

1. Field of the Invention

The present invention relates to a disk brake apparatus comprising a piston for hydraulically compressing a friction pad, an adjuster for automatically adjusting a gap between the friction pad and a disk rotor, and a parking brake for compressing the piston through the adjuster by a ball-ramp type thrust conversion mechanism.

2. Description of the Background Art

As a disk brake apparatus for a four-wheeled vehicle, there has been provided a disk brake apparatus with a parking brake. The disk brake apparatus with a parking brake comprises a hydraulic actuating mechanism operated through a brake pedal, and a mechanical actuating mechanism pulled and operated through a hand lever or a foot pedal. In general, in this disk brake apparatus with the parking brake, a piston constituting the hydraulic actuating mechanism is positioned at a front opening side of a cylinder bore in a caliper body, an adjuster having an adjusting nut and an adjusting bolt is positioned at the rear (bottom) side of this piston, and a thrust conversion mechanism constituting the mechanical actuating mechanism is positioned at the bottom side of the cylinder.

As the thrust conversion mechanism, a ball-ramp type has been well known in the related art. This ball-ramp type thrust conversion mechanism is arranged in a following manner. A fixed-side cam plate and a driving side cam plate, each of which is formed with a ramp recess for receiving a cam bearing, are positioned to be faced one another. As the driving-side cam plate is rotated by operating a parking brake, thrust for moving the piston toward a disk rotor is produced by a cam action of the ramp recess and the cam bearing. Then, the piston is compressively moved toward the disk rotor through an adjuster by this thrust, and a friction pad is compressed against the disk rotor, whereby a braking force is obtained. In addition, the fixed-side cam plate, the driving-side cam plate, the thrust transfer plate, and a cam spring for biasing the thrust transfer plate toward the driving-side cam plate are received in a substantially cylindrical housing, thereby forming a unit so as to enhance the assemblability (for example, Japanese Patent Examined Publication JP-B-2739879).

In the above-mentioned ball-ramp type thrust conversion mechanism, it was required to restrain a rotation in a circumferential direction of the cylinder as well as a movement a the cylinder axis of the housing, because the fixed-side cam plate, the driving-side cam plate, the thrust transfer plate and the cam spring are accommodated in the substantially cylindrical housing, and they form a unit in total. For this reason, the fixed-side cam plate is engaged with the bottom part of the cylinder bore by projection-recession engagement or through a pin-engagement, thereby being restrained from rotating. In addition, the housing has a mounting piece, which is provided on and projected from the circumferential wall thereof, so that the housing is fitted in the cylinder bore by fastening the mounting piece to a stop ring fitted in the cylinder bore. As a result, a lot of time is required for mounting and machining the fixed-side cam plate as well as for mounting the housing, and the number of components is increased.

SUMMARY OF THE INVENTION

Therefore, an object of the present invention is to provide a disk brake apparatus, wherein a fixed-side cam plate, a driving-side cam plate, a thrust transfer plate, and a cam spring are received in a substantially cylindrical housing, thereby forming a unit, so that with a simple construction, the housing can be restrained from rotating in the cylinder's circumferential direction and moving in the cylinder's axial direction, a good stroke feeling can be obtained at the time of manipulating a parking brake, and an adjuster can be reliably operated in such a manner at to always keep the braking gap between a friction pad and a disk rotor well.

According to a first aspect of the invention, there is provided a disk brake apparatus comprising:

a cylinder bore that is formed in a caliper body so as to extend in a cylinder axis and comprising an opening at a front side; and a bottom wall at bottom side;

a piston accommodated in the cylinder bore at the front side of the cylinder bore;

a thrust conversion mechanism provided at the bottom side of the cylinder bore and comprises:

a fixed-side cam plate fitted to the bottom wall of the cylinder bore;

a cam shaft provided so as to rotatably penetrate the bottom wall of the cylinder bore and the fixed-side cam plate and also to be movable in the cylinder axis;

a driving-side cam plate provided on the cam shaft at the front side of the cylinder bore;

ramp recesses respectively formed on the driving-side cam plate and the fixed-side cam plate so as to oppose to each other; and cam bearings accommodated in the ramp recesses;

an adjuster that is provided between the thrust conversion mechanism and the piston and comprises:

an adjusting nut;

an adjusting bolt;

a thrust transfer plate provided on either of the adjusting nut and the adjusting bolt at the bottom side of the cylinder so as to oppose to the driving-side cam plate; and a cam spring that biases the thrust transfer plate toward the driving-side cam plate; and a housing accommodating the fixed-side cam plate, the driving side cam plate, the thrust transfer plate and the cam spring, wherein a fastening groove is provided on a bottom surface of the fixed-side cam plate, the bottom surface being opposed to the bottom wall of the cylinder bore, a fastening piece is provided on the housing at the bottom side of the cylinder bore so as to fit to fastening groove, the cylinder bore comprising an axial groove on an inner peripheral surface thereof at the bottom side, and the fixed-side cam plate comprising an anti-rotation projection projected from an outer circumferential surface thereof so as to engage with the axial groove of the cylinder bore.

According to a second aspect of the invention as set forth in the first aspect of the invention, the cylinder bore comprising a circumferential groove, which intersects with the axial groove, on the inner peripheral surface.

According to a third aspect of the invention as set forth in the second aspect of the invention, the housing comprises an engagement rib that is insertable into the axial groove of the cylinder bore from the front side and also engages with the circumferential groove of the cylinder bore.

According to a fourth aspect of the invention as set forth in the third aspect of the invention, the axial grooves, the anti-rotation projections and the engagement ribs are respectively provided along with a circumferential direction of the cylinder bore with a constant interval, the fastening grooves are provided along with the circumferential direction so as to be next to the anti-rotation projections with a constant interval, and the fastening pieces are provided along with the circumferential direction so as to be next to the engagement ribs with a constant interval.

According to a fifth aspect of the invention as set forth in the first aspect of the invention, a number of the axial grooves and the anti-rotation projections is at least three, respectively.

According to the invention, the fixed-side cam plate is restrained from rotating as the anti-rotation projections are inserted into the axial grooves. As the fastening pieces of the housing are fitted in the fastening grooves on the fixed-side cam plate, which is in the state of being restrained from rotating, and the engagement ribs are inserted into the circumferential groove, the housing is arranged in the cylinder bore in a state of being non-rotatable as well as being restrained from moving in the cylinder axis. As a result, with a simple structure, a good stroke feeling can be obtained at the time of manipulating the parking brake. Further, the adjuster can be reliably operated in such a manner as to always well retain the braking gap between the friction pad and the disk rotor In addition, the number of components can also be reduced.

Furthermore, assembling efficiency can be enhanced in a following manner.

At first, accommodating the driving-side cam plate, the thrust transfer plate, and the cam spring in the housing. Then, fastening the fastening pieces of the housing to the fixed-side cam plate (where other than the fastening groove). Thus, the fixed-side cam plate, the driving-side cam plate, the thrust transfer plate, and the cam spring are temporally assembled into the housing as a unit.

Subsequently, by rotating the housing so as to align positions of fastening piece of the fixed-side cam plate and the engagement rib of the housing to insert to the axial direction of the cylinder bore.

Then, by rotating the housing, inserting the engagement rib to the circumferential groove of the cylinder bore.

Finally, by rotating the housing to engage the fastening piece of the housing with the fastening groove of the fix-side cam plate to attach the unit within the cylinder bore easily.

In addition, by providing anti-rotation projections, which are inserted into the axial grooves, the fixed-side cam plate is restrained from rotating. Furthermore, by being provided with a plurality of anti-rotation projections with constant intervals in the circumferential direction of the cylinder, the cam shaft insertion hole formed at the center of the fixed-side cam plate can be centered so that the fixed cam plate can be reliably located at a proper position. As a result, even if load is applied to the fixed-side cam plate at the time of operation, the driving-side cam plate on the cam shaft can be installed always in a stable state and the manipulation of the parking brake can be well performed without causing the fixed-side cam plate to be off-centered. Furthermore, when the unit formed by temporarily assembling the fixed-side cam plate, the driving-side cam plate, the thrust transfer plate, and the cam spring into the housing is fitted in the cylinder bore, the anti-rotation projections of the unit and the engagement ribs are inserted into the axial grooves of the cylinder bore. Then, the housing is rotated in such a manner as to insert the engagement ribs into the circumferential groove of the cylinder bore. Therefore, even if load is applied to the fixed-side cam plate when the fastening pieces of the housing are inserted into the fastening grooves of the fixed-side cam plate, the unit can be simply and reliably mounted without being off-centered because the plurality of anti-rotation pieces are engaged with the axial grooves.

BRIEF DESCRIPTION OF THE DRAWINGS

FIG. 2 is a cross-sectional view taken along line II-II of FIG. 1;

FIG. 3 is a cross-sectional view taken along line III-III of FIG. 1;

DETAILED DESCRIPTION OF THE PREFERRED EMBODIMENTS

Figure 1:
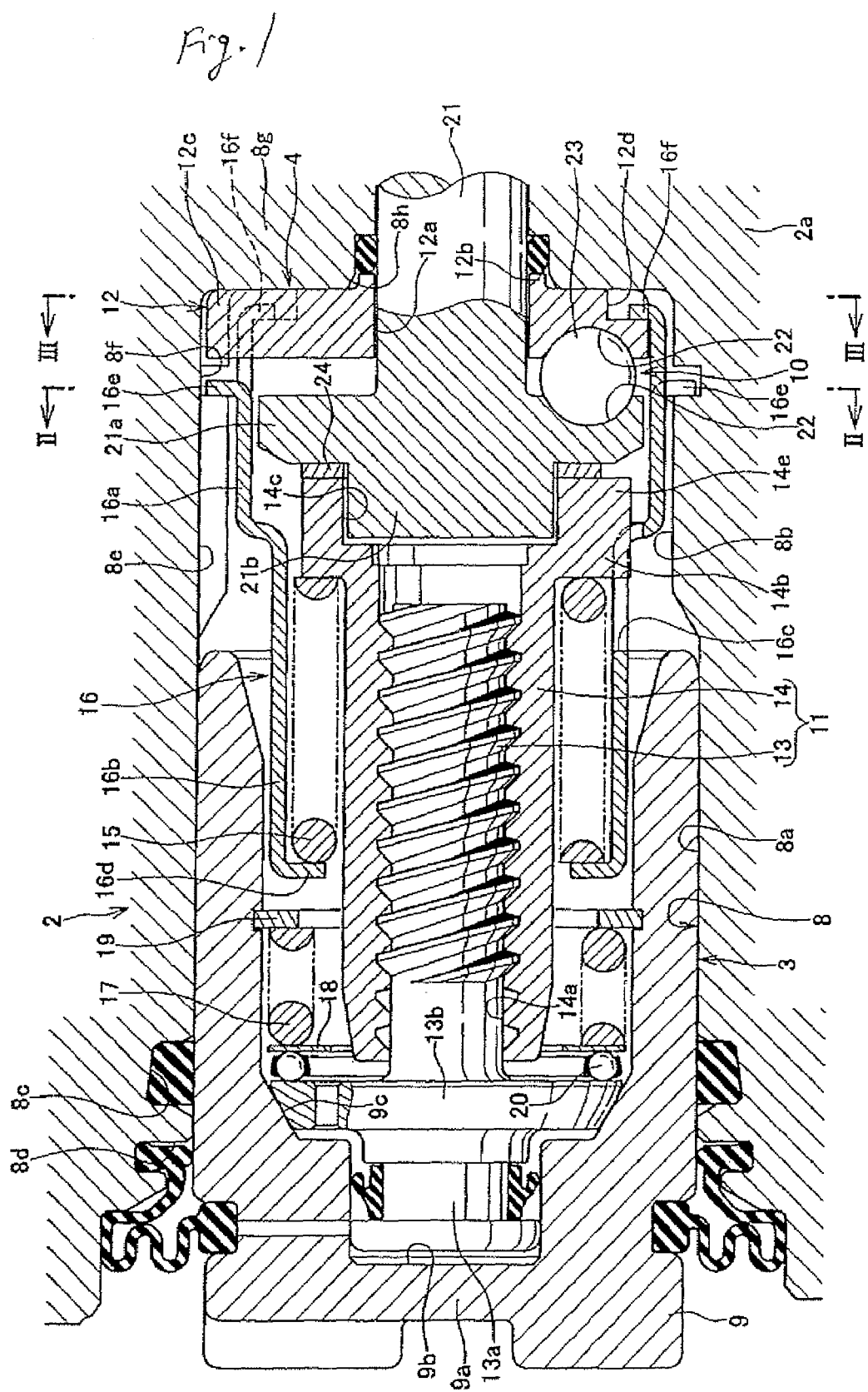
FIG. 1 is an enlarged cross-sectional view of a main part of a disk brake apparatus according to an embodiment of the present invention.
Figure 4:
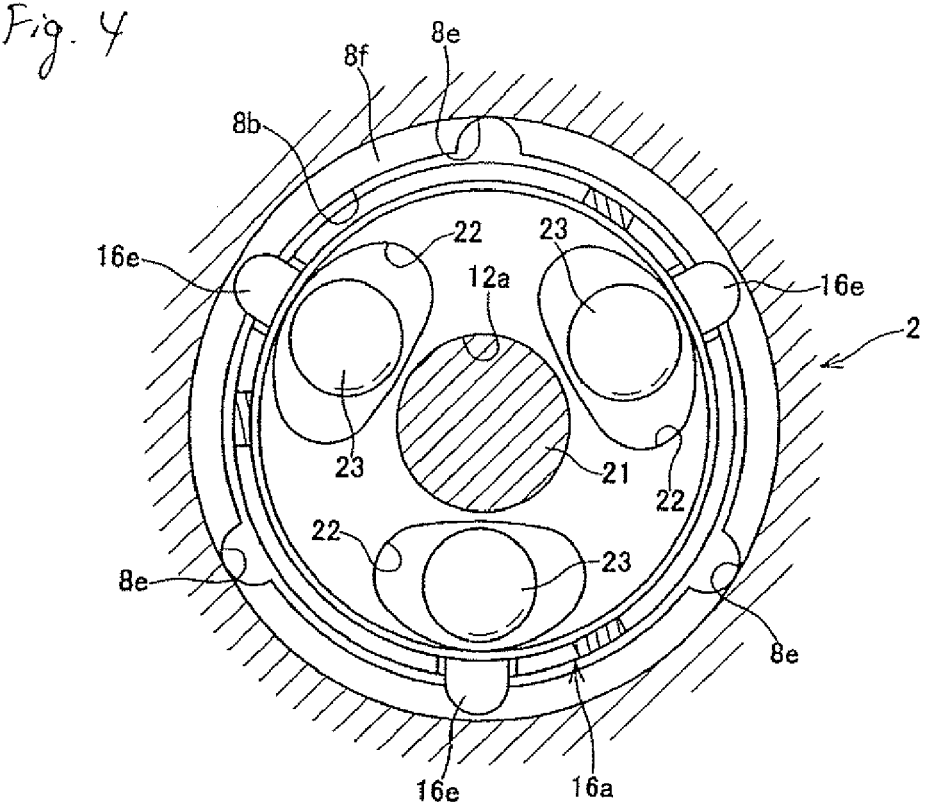
FIG. 4 is an illustrative view showing a housing in a state in which the housing has been rotated from the state of FIG. 2.
Figure 5:
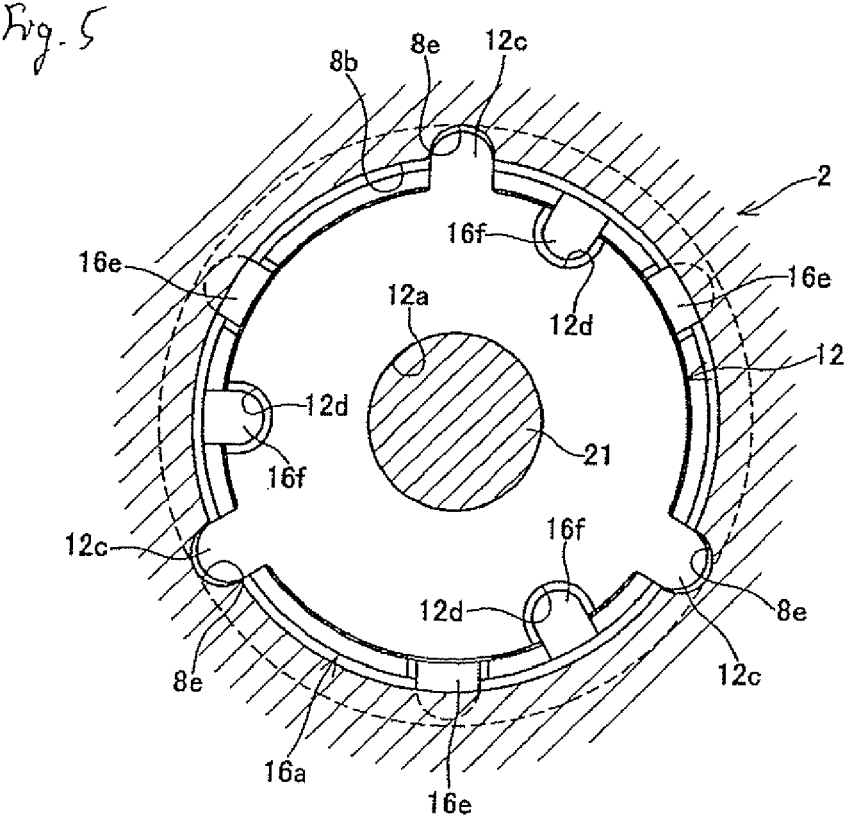
FIG. 5 is an illustrative view showing the housing in a state in which the housing has been rotated from the state of FIG. 3 and then fastening pieces are fitted in fastening grooves.
Figure 6:
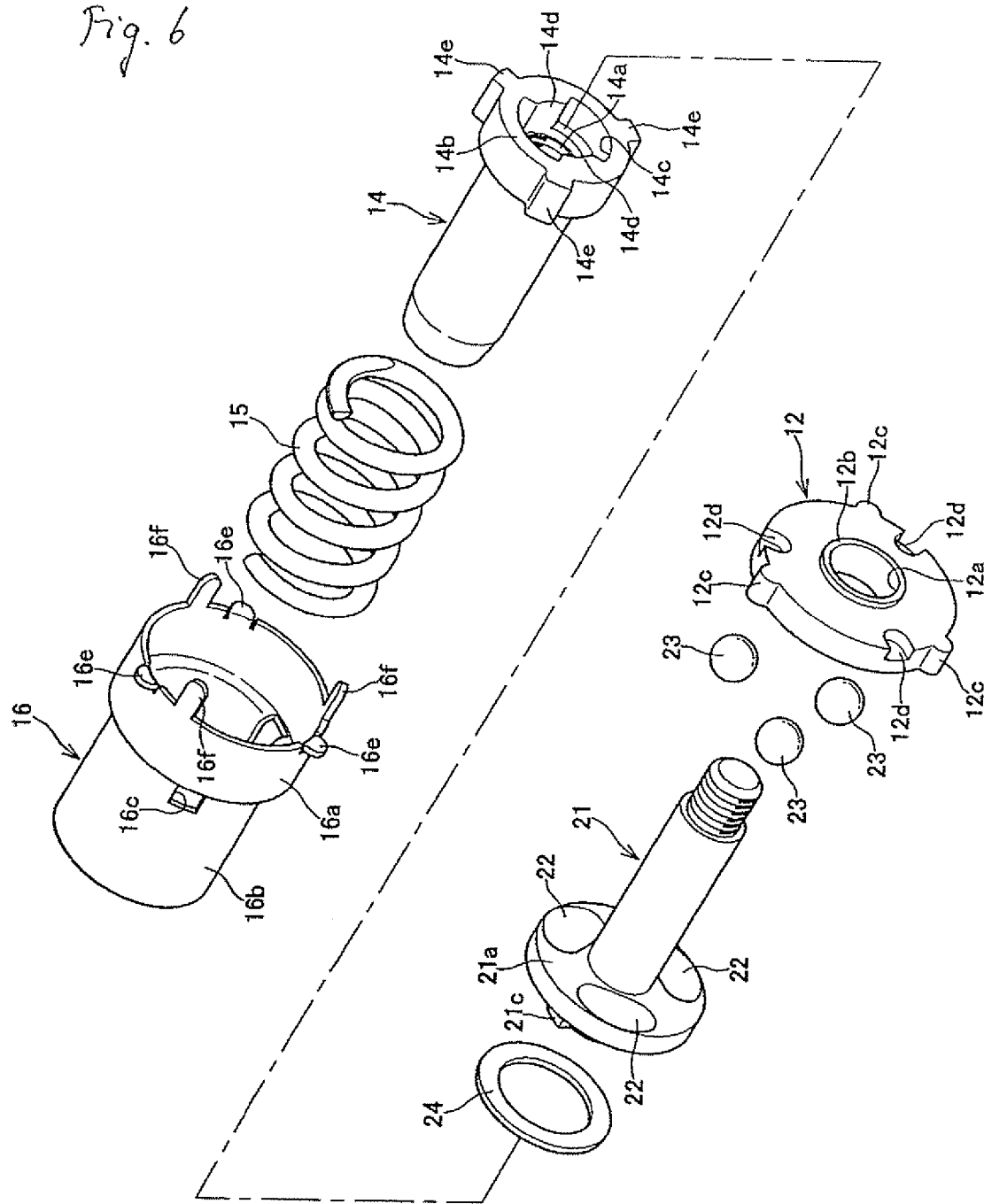
FIG. 6 is an exploded perspective view of a thrust conversion mechanism, a adjusting nut, and a housing.
Figure 7:
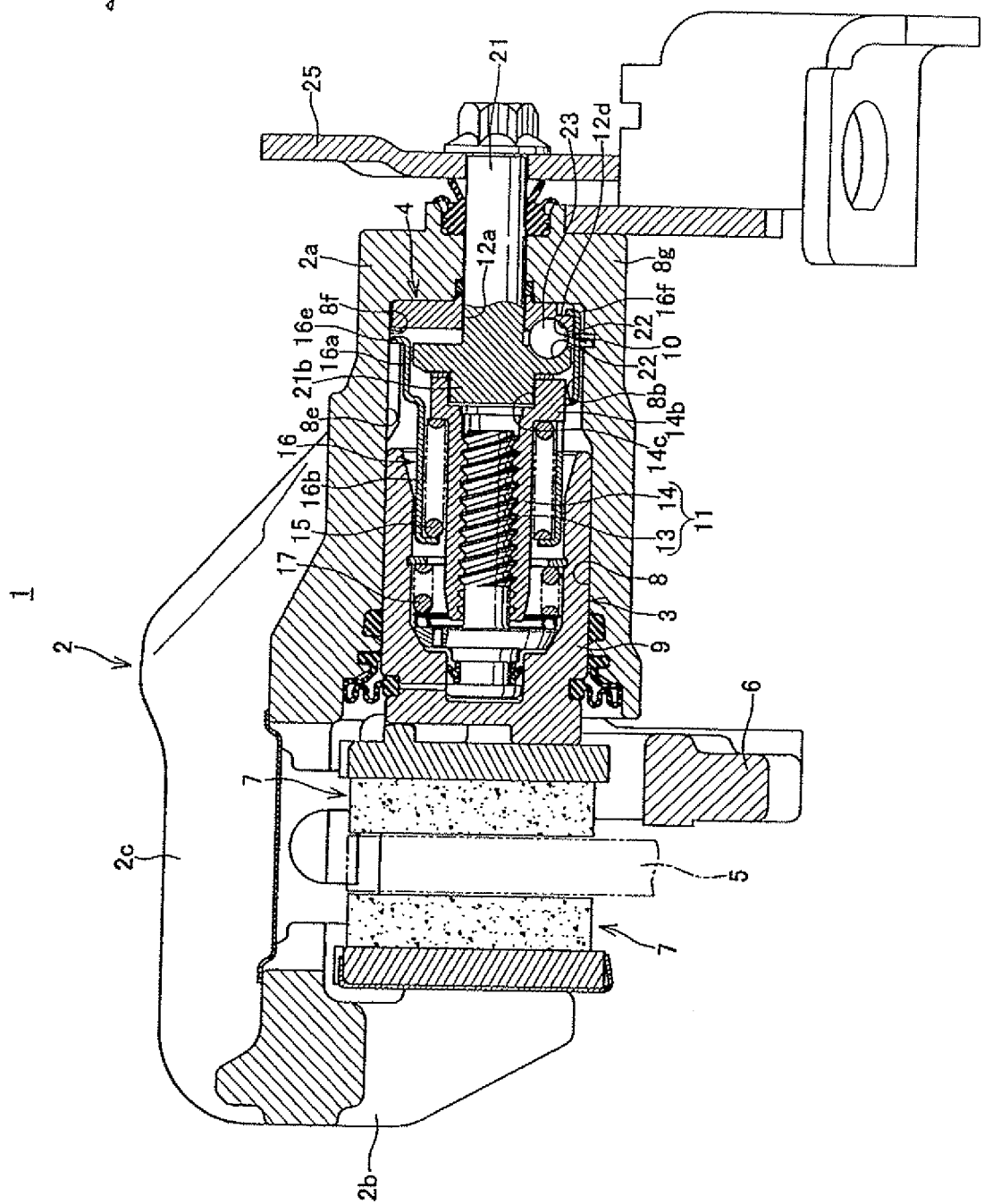
FIG. 7 is a cross-sectional front view of the disk brake apparatus.

Hereinafter, embodiments of the present invention are described in detail with reference to the drawings. FIGS. 1 to 7 show embodiments of the present invention. FIG. 1 is an enlarged cross-sectional view of a main part of a disk brake apparatus. FIG. 2 is a cross-sectional view taken along line II-II of FIG. 1. FIG. 3 is a cross-sectional view taken along line III-III of FIG. 1. FIG. 4 is an illustrative view showing a housing in a state in which the housing has been rotated from the state of FIG. 2. FIG. 5 is an illustrative view showing the housing in a state of in which the housing has been rotated from the state of FIG. 3 and then fastening pieces have been fitted in a fastening grooves. FIG. 6 is an exploded perspective view of a thrust conversion mechanism, an adjusting nut, and the housing. FIG. 7 is a cross-sectional front view of the disk brake apparatus.

This disk brake apparatus 1 is a disk brake apparatus with the parking brake comprising a caliper body 2. The caliper body 2 comprises a hydraulic actuating mechanism 3 operated through a brake pedal (not shown) and a mechanical actuating mechanism 4 for the parking brake, which is operated through a hand lever or a foot pedal. The caliper body 2 is supported on a caliper bracket 6, which is fixedly installed on a vehicle body at a side of a disk rotor 5, in such a manner as to be movable in the axial direction of the disk through a pair of sliding pins (not shown).

The caliper body 2 has action and reaction parts 2a and 2b, which are oppositely located on opposite sides of the disk rotor 5, respectively and a bridge part 2c which extends beyond the outside of the disk rotor 5 and interconnects the action and reaction parts 2a and 2b. A pair of friction pads 7, 7 is arranged in such a manner to sandwich the disk rotor 5 between them.

The action part 2a is formed with a cylinder bore 8, which is opened toward the disk rotor 5. The cylinder bore 8 has a large diameter part 8a and a small diameter part 8b, which are formed at front side of the cylinder bore side and the bottom side, respectively. The large diameter part 8a is formed with a seal groove 8c and a boot's groove 8d, which are circumferentially extended, at the front side of cylinder bore, respectively. The small diameter part 8b is formed with three axial grooves 8e which extend in the axial direction and separated with constant intervals in the circumferential direction. The cylinder bore is formed with a circumferential groove 8f, which extends in the circumferential direction of the cylinder and intersects all of the respective axial grooves 8e.

A bottomed cylindrical piston 9 constituting the hydraulic actuating mechanism 3 is accommodated in the large diameter part 8a of the cylinder bore 8. A ball-ramp type thrust conversion mechanism 10 constituting the mechanical actuating mechanism 4 is accommodated in the small diameter part 8b. An adjuster 11 is positioned between the piston 9 and the thrust conversion mechanism 10 for automatically adjusting the braking gap between the disk rotor 5 and the friction pads 7. In addition, a fixed-side cam plate 12 is positioned on the bottom wall of the cylinder bore 8g.

The adjuster 11 comprises an adjusting bolt 13 and an adjusting nut 14, wherein the head of the adjusting bolt 13 is equipped with a small diameter piston 13a and a clutch plate 13b. The adjusting nut 14 is formed with a plurality of internal screw threads 14a, which are mated with the adjuster bolt 13. In addition, a cylindrical housing 16 for receiving a cam spring 15 and a thrust transfer plate 14b are arranged on the outer circumference of the adjusting nut 14.

The piston 9 is accommodated in the large diameter part 8a of the cylinder bore 8 with the bottom wall 9a being directed toward the disk rotor side. The adjusting nut 14 and the adjusting bolt 13 are provided on the internal central axis of the piston 9. A fitting hole 9b is provided in the inner circumferential surface of the bottom wall of the piston 9. The small diameter piston 13a is fitted in the fitting hole 9b through seal material. The clutch plate 13b is compressed against a conical surface 9c by the action of the adjusting spring 17, the conical surface 9c being widened from the opening of the fitting hole 9b.

The adjusting spring 17 is retained at one end by a bearing abutment 18 and at the other end by a stop ring 19, and biases the adjusting bolt 13 toward the bottom wall 9a in a rotatable state via the bearing abutment 18 and the bearing 20.

The thrust conversion mechanism 10 comprises: a cam shaft 21, which rotatably penetrates the bottom wall of the cylinder bore 8g and the fixed-side cam plate 12 and is movable in the cylinder axis relative to the bottom wall of the cylinder bore 8g and the fixed-side cam plate 12; a driving-side cam plate 21a provided on the cam shaft 21 at the front side of the cylinder bore; three pairs of ramp recesses 22, each pairs of ramp recesses being formed in confronting positions of the driving-side cam plate 21a and the fixed-side cam plate 12, respectively, and three cam bearings 23 accommodated in the ramp recesses 22.

The driving-side cam plate 21a has a cylindrical part 21b provided at and projected from the central area of the front side of the cylinder bore and two projections 21c, 21c provided on the outer circumferential area of the cylindrical part 21b to be projected diametrically opposite to each other.

The thrust transfer plate 14b abuts against the side surface of the opening of the cylinder bore through a trust bearing 24.

At the bottom side of the cylinder bore, the thrust transfer plate 14b is formed with a reception hole 14c for receiving the cylindrical part 21b and the projections 21c, 21c. Restraint parts 14d, 14d abutting against the projections 21c, 21c are provided on the internal circumference of the reception hole 14c. The restraint parts 14d, 14d restrain the amount of rotation of the driving-side cam plate 21a to the extent that the respective bearings 23 are not released from the ramp recesses 22. In addition, three engaging projections 14e are provided on the outer circumference of the thrust transfer plate 14b with a constant interval each other.

The fixed-side cam plate 12 is formed in a disk shape and has a insertion hole 12a provided at the center thereof, through which the cam shaft 21 extends, and a rib 12b projected from the bottom surface around the insertion hole 12a. The rib 12b is inserted into a rib reception groove 8h provided in the bottom wall of the cylinder bore 8g. In addition, the fixed-side cam plate 12 has three anti-rotation projections 12c, which are formed along with the circumference direction with a constant interval each other in the circumferential direction. The anti-rotation projections 12c are engaged with the respective axial grooves 8e of the cylinder bore 8, respectively. Fastening grooves 12d, which are formed on the circumference of the bottom surface of the fixed-side cam at a side of each of the anti-rotation projections 12c with a constant interval from the anti-rotation projections 12c in the circumferential direction, respectively.

The housing 16 comprises a large cylinder part 16a formed in a diameter slightly smaller than that of the small diameter part 8b of the cylinder bore 8, and a small cylinder part 16b formed in an internal diameter larger than the outer diameter of the thrust transfer plate 14b formed in the adjusting nut 14. The large cylinder part 16a and the small cylinder part 16b are integral with each other. The small cylinder part 16b has three engagement holes 16c formed at the bottom side of the cylinder. The engaging projections 14e of the thrust transfer plate 14b are engaged in the engagement holes 16c, respectively, in such a manner as to be movable only in the axial direction, respectively. In addition, at the front side of the cylinder bore, the small cylinder part 16b has a support piece 16d which is internally projected from the circumference thereof for supporting the cam spring 15. At the bottom side of the cylinder, the large cylinder part 16a has engagement ribs 16e, which are formed circumferentially with constant intervals. The engagement ribs 16e are engaged in the circumferential groove 8f of the cylinder bore 8, respectively, in such a manner as to be inserted into the axial grooves 8e of the cylinder bore 8, respectively. The large cylinder part 16e has fastening pieces 16f, which are formed at a circumferential side from each of the engagement ribs 16e with a constant interval from the engagement ribs 16e in the circumferential direction, respectively.

The aforementioned disk brake apparatus 1 is assembled as follows.

The cam spring 15 is inserted to the housing 16 from an opening at the bottom side of the cylinder bore. One end of cam spring 15 is made abutted on a supporting piece 16d and inserting the adjust nut 14 to the inner circumferential surface of the cam spring 15.

Other end of the cam spring 15 is abutted on cylinder bore opening end side of the thrust transfer plate 14b provided on the adjust nut 14 so that the engaging projections 14e of the adjusting nut 14 are engaged with the engagement holes 16c of the housing 16.

Next, in the reception hole 14c of the thrust transfer plate 14b, the cylinder part 21b and the projections 21c, 21c of the driving-side cam plate 21 are received so that the bottom side surface of the thrust transfer plate 14b and the front side surface of the driving-side cam plate 21a are abutted each other via the thrust bearing 24. The driving-side cam plate 21a is restrained from rotating beyond a predetermined amount of rotation since the projections 21c formed on the cylinder part 21b are engaged with restraint parts 14d formed in the reception hole 14c.

Next, the fixed-side cam plate 12 is positioned in the bottom side of the cylinder of the driving-side cam plate 21a by inserting the cam shaft 21 through the insertion hole 12a of the fixed-side cam plate 12 in such a manner that the cam bearings 23 are received in the ramp recesses 22. Then, the fastening pieces 16f of the housing 16 are bent and engaged with the bottom surface of the fixed cam plate 12 where other than the engagements grooves 12d, According to this structure, the fixed-side cam plate 12 is temporarily assembled to the bottom side of the housing 16, so that the thrust conversion mechanism 10, the thrust transfer plate 14b and the cam spring 15 can be assembled into the housing 15 as a unit.

Thus assembled unit is, by rotating the housing 16 and the fixed-side cam plate 12, the circumferential directions of the engagement ribs 16e of the housing 16 and the anti-rotation projections 12c are matched. Then, the while directing the fixed-side cam plate 12 to the bottom wall 8g of the cylinder bore side, the anti-rotation projections 12c and the engagement rib 16e are inserted to the axial grooves 8e of the cylinder bore, respectively.

At this time, on the fixed-side cam plate 12, the three anti-rotation projections, which are inserted to the axial grooves 8e, respectively, are provided in the circumferential direction with the constant intervals. Thus, the rotation of the fixed-side cam plate 12 is restrained and the centering of the insertion hole 12a, which is formed at the center of the fixed-side cam plate 12 and through which the cam shaft is inserted, can be performed, and the insertion hole 12a can be arranged at a proper position.

Next, the housing 16 is rotated so that the engagement ribs 16e of the housing 15 are engaged with the circumferential groove 8f in the cylinder bore 8 and the fastening pieces 16f of the housing 16 are fitted in the engagement grooves 12d of the fixed-side cam plate 12, respectively. According to this structure, the unit is fixed within the cylinder bore 8. Although a load is applied to the fixed-side cam plate 12 when the housing 16 is rotated in this manner, the driving-side cam plate 21a provided on the cam shaft 21 can be always arranged in a good condition within the cylinder bore 8 without causing the fixed cam plate 12 to be rotated or off-centered, because the three anti-rotation projections 12c of the fixed-side cam plate 12 are inserted in the axial grooves 8e.

Meanwhile, within the piston 9, the adjusting bolt 13, the bearing 20, the bearing abutment 18, the adjusting spring 17, the stop ring 19 are sequentially mounted, thereby forming a single unit.

Next, while the adjusting bolt 13 is mated with the adjusting nut 14, the piston 9 is pressure-fitted in the cylinder bore 8, and a manipulation lever 25 is fitted on the projecting end of the cam shaft 21. As a result, the hydraulic actuating mechanism 3, the mechanical actuating mechanism 4 and the adjuster 11 are assembled to the caliper body 2. In addition, each seal material can be mounted in an appropriate step.

With this disk brake apparatus 1, in the brake operation using the hydraulic actuating mechanism 3, the piston 9 is compressively moved toward the disk rotor by the pressure of the hydraulic fluid introduced into the cylinder bore 8, whereby the friction pad 7 of the action part 2a is compressed against one side surface of the disk rotor 5, and by the reaction force to this action, the caliper body 2 is moved toward the action part 2a and the reaction part 2b compresses the friction pad 7 of the reaction part 2b side against the other side surface of the disk brake 5, thereby performing the braking action.

In this case, when the braking gap between the friction pads 7 and the disk rotor 5 is in a predetermined range, the adjusting action is not performed when the piston 9 only moves to a moving amount corresponding to the backlash of the adjusting bolt 13 and the adjusting nut 14. When the braking gap between the friction pads 7 and the disk rotor 5 exceeds the predetermined range due to the wear of the friction pads 7, piston 9 largely moves toward over the backlash, whereby the clutch plate 13b and the conical surface 9c of the piston 9 are spaced from each other. In this state, the adjusting bolt 13 is pushed out of the adjusting nut 14 by the biasing force of the adjusting spring 17, and the clutch plate 13b and the conical surface 9c abut against each other. In this state, when the manipulation of the brake is released, the piston 9 and the adjusting bolt 3 retreat by the backlash, whereby the braking gap between the friction pads 7 and the disk rotor 5 will be automatically adjusted.

In addition, in the parking braking manipulation by means of the mechanical actuating mechanism 4, if the manipulation lever 25 is rotationally manipulated through a hand lever or a foot pedal which is not shown in the drawings, the driving-side cam plate 21a rotates along with the cam shaft 21, and as the respective ramp recesses 22 of the driving-side cam plate 21a and the respective ramp groves 22 of the fixed-side cam plate 12 are offset from each other in phase, wherein the fixed-side cam plate 12 is in the non-rotatable condition as the anti-rotation projections 12c and the axial grooves 8e are engaged with each other, the cam bearings 23 move toward the shallow parts of the ramp recesses 22, respectively, thereby causing the driving-side cam plate 21a to be displaced away from the fixed-side cam plate 12, thereby moving the driving-side cam plate 21a toward the disk rotor. Such an axial movement of this driving-side cam plate 21a is transferred to the piston 9 from the adjusting nut 14 through the adjusting bolt 13 and turned into thrust for compressively moving the piston 9 toward the disk rotor, whereby the braking action is performed in the same manner as the braking action through the hydraulic actuating mechanism 3.

Like this, when the manipulation of the parking brake is performed by means of the mechanical actuating mechanism 4, the fixed-side cam plate 12 is prevented from rotating as the anti-rotation projections 12c are inserted into the axial grooves 8e in the cylinder bore 8, and the housing 16 is prevented from rotating as the fastening pieces 16f are fitted in the engagement grooves 12 of the fixed-side cam plate 12 in the anti-rotating state, respectively, and restrained from moving in the cylinder axis as the engagement ribs 16e are inserted into the circumferential groove 8f in the cylinder bore 8. In addition, as being engaged with the engagement holes 16c of the housing 16, the thrust transfer plate 14b is prevented from rotating in a state of being axially movable. As a result, when manipulating the parking brake, it is possible to obtain a good stroke feeling as well as to reliably operate the adjuster 11 in such a manner as to always maintain the braking gap between the friction pads 7 and the disk rotor 5 in a good condition. Furthermore, the assembly of the housing 16, in which the fixed-side cam plate 12, the thrust conversion mechanism 10, the thrust transfer plate 14 and the cam spring are received, into the cylinder bore is easy, whereby the workability for assembling the disk brake apparatus 1 can be enhanced. In addition, as the three anti-rotation projections 12c are engaged with the axial grooves 8e, respectively, the driving-side cam plate 21a provided on the cam shaft 21 can be rotated always in a stable state without causing the fixed-side cam plate 12 from being rotated or off-centered and the parking braking operation can be well performed, even if a load is applied to the fixed-side cam plate 12 at the time of operation.

In addition, without being limited to the above-mentioned type, in which the thrust transfer plate is formed in the adjusting nut and the adjusting nut is received in the housing, it is also possible to form the thrust plate on the adjusting bolt and to receive the adjusting bolt in the housing. Furthermore, the anti-rotation mechanism of the cam shaft may be implemented by causing the manipulation lever for rotating the cam shaft and the projections provided on the outer surface of the caliper body to abut against each other. Moreover, although the axial grooves, anti-rotation projections and engagement ribs may be provided by one or more, respectively, without being limited to providing axial grooves, anti-rotation projections and engagement ribs by three as in the above-mentioned embodiment, it is desirable that the axial grooves, the anti-rotation projections and the engagement ribs are provided by at least three, respectively, in such a manner as to be equi-spaced from each other in the circumferential direction of the cylinder in order to keep the centering effect of the insertion hole for the cam shaft, wherein the insertion hole is formed in the fixed cam plate.

What is claimed is:

1. A disk brake apparatus comprising:
    a cylinder bore that is formed in a caliper body so as to extend in a cylinder axis and comprising
       an opening at a front side; and
       a bottom wall at a bottom side;
    a piston accommodated in the cylinder bore at the front side of the cylinder bore;
    a thrust conversion mechanism provided at the bottom side of the cylinder bore and comprises:
       a fixed-side cam plate fitted to the bottom wall of the cylinder bore;
       a cam shaft provided so as to rotatably penetrate the bottom wall of the cylinder bore and the fixed-side cam plate and also to be movable in the cylinder axis;
       a driving-side cam plate provided on the cam shaft at the front side of the cylinder bore;
       ramp recesses respectively formed on the driving-side cam plate and the fixed-side cam plate so as to oppose to each other; and
       cam bearings accommodated in the ramp recesses;
    an adjuster that is provided between the thrust conversion mechanism and the piston and comprises:
       an adjusting nut;
       an adjusting bolt;
       a thrust transfer plate provided on either of the adjusting nut and the adjusting bolt at the bottom side of the cylinder so as to oppose to the driving-side cam plate; and
       a cam spring that biases the thrust transfer plate toward the driving-side cam plate; and
    a housing accommodating the fixed-side cam plate, the driving side cam plate, the thrust transfer plate and the cam spring,
    wherein a fastening groove is provided on a bottom surface of the fixed-side cam plate, the bottom surface being opposed to the bottom wall of the cylinder bore,
    a fastening piece is provided on the housing at the bottom side of the cylinder bore so as to fit to the fastening groove,
    the cylinder bore comprising an axial groove on an inner peripheral surface thereof at the bottom side, and
    the fixed-side cam plate comprising an anti-rotation projection projected from an outer circumferential surface thereof so as to engage with the axial groove of the cylinder bore.

2. The disk brake apparatus as set forth in claim 1, wherein
    the cylinder bore comprising a circumferential groove, which intersects with the axial groove, on the inner peripheral surface.

3. The disk brake apparatus as set forth in claim 2, wherein
    the housing comprises an engagement rib that is insertable into the axial groove of the cylinder bore from the front side and also engages with the circumferential groove of the cylinder bore.

4. The disk brake apparatus as set forth in claim 3, wherein
    the axial grooves, the anti-rotation projections and the engagement ribs are respectively provided along with a circumferential direction of the cylinder bore with a constant interval,
    the fastening grooves are provided along with the circumferential direction so as to be next to the anti-rotation projections with a constant interval, and
    the fastening pieces are provided along with the circumferential direction so as to be next to the engagement ribs with a constant interval.

5. The disk brake apparatus as set forth in claim 1, wherein a number of the axial grooves and the anti-rotation projections is at least three, respectively.

* * * * *